No. 689,330. Patented Dec. 17, 1901.
J. E. SPAFFORD.
REED OR DINNER HORN.
(Application filed May 6, 1901.)
(No Model.)
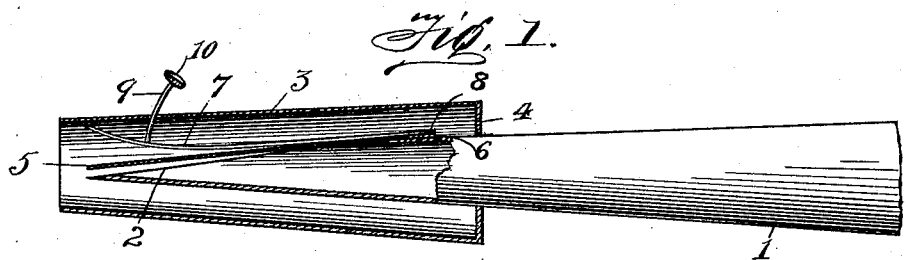
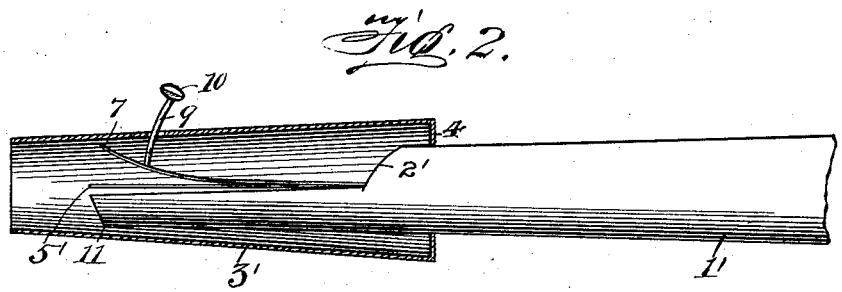
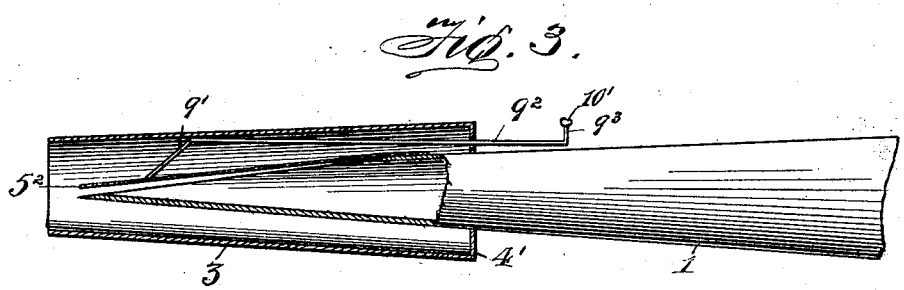
Witnesses
F. S. Belt
E. M. Kitchin
Inventor
John E. Spafford
By Mason Fenwick & Lawrence
his Attorneys
THE NORRIS PETERS CO., PHOTO-LITHO., WASHINGTON, D. C.

UNITED STATES PATENT OFFICE.

JOHN E. SPAFFORD, OF KEARNEY, NEBRASKA, ASSIGNOR OF ONE-HALF TO EDGAR M. PERRY, OF KEARNEY, NEBRASKA.

REED OR DINNER HORN.

SPECIFICATION forming part of Letters Patent No. 689,330, dated December 17, 1901.

Application filed May 6, 1901. Serial No. 58,988. (No model.)

*To all whom it may concern:*

Be it known that I, JOHN E. SPAFFORD, a citizen of the United States, residing at Kearney, in the county of Buffalo and State of Nebraska, have invented certain new and useful Improvements in Reed or Dinner Horns; and I do hereby declare the following to be a full, clear, and exact description of the invention, such as will enable others skilled in the art to which it appertains to make and use the same.

This invention relates to improvements in reed or dinner horns, and more particularly to an instrument provided with a single reed and means for varying the pitch of its tone.

The object of the invention is to provide a horn having a reed capable of varying the degree of its tone; and with this object in view it consists of a suitable tube, a reed operable therein, and means for shortening the length of the vibratory portion of said reed.

It also has certain other objects in view; and it consists in the improved combinations, constructions, and arrangements of parts, as will be hereinafter fully described and claimed.

In the accompanying drawings, Figure 1 represents a view, partly in longitudinal vertical section and partly in elevation, of a reed or dinner horn made in accordance with my invention; and Figs. 2 and 3 are similar views of slight modifications of the same.

The principle of operation of my invention is the production of varying tones by increasing or diminishing the length of movement of the sound-producing reed, and in order to accomplish this I preferably provide any suitable tube, as 1, having at its outer end any suitable bell (not shown) and having its inner end beveled, as at 2, and extending into a mouthpiece, as 3. The mouthpiece 3 is preferably provided at its forward end with an annular shoulder, as 4, which fits snugly the said tube 1 and prevents the escape of air. The opposite end of said mouthpiece is made in any desired form and shape and provided with an aperture for the admission of air.

A reed, as 5, of any suitable material, preferably of thin brass, is secured to the inner end of tube 1, as at 6, and is adapted to partially close the beveled open end 2 of said tube, whereby air blown through said mouthpiece and tube will vibrate said reed and produce a sound. A strip of material, as 7, preferably of spring metal, is secured above reed 5, as at 8, and curves from the point of attachment toward the wall of the mouthpiece, so that said reed 5 is normally free to vibrate for its entire length. The strip 7 carries near its free end a suitable stem, as 9, passing through an aperture in the wall of said mouthpiece, and is provided at its outer end with a suitable head 10.

The operation of my improved reed or dinner horn will be readily understood from the foregoing description. Air-pressure passed through mouthpiece 3 and tube 1 will vibrate reed 5, and greater or less pressure upon head 10 will contact strip 7 with reed 5 to a greater or less extent, and thereby increase or decrease the length of the vibrating portion of said reed, whereby a higher or lower tone is produced, varying in degree in accordance with the length of reed which is permitted to vibrate.

In Fig. 2 is illustrated a slightly-modified form of tube, as 1', which instead of having a beveled inner end is formed with a shoulder, as 2', which is closed against the passage of air, and the extreme inner end as 11, is also closed against the passage of air, whereby air introduced through mouthpiece 3' must enter the elongated opening of said tube 1' between shoulder 2' and end 11, whereby reed 5' will be caused to vibrate and may be controlled similarly to the construction shown in Fig. 1 by a similar mechanism, as illustrated.

Fig. 3 illustrates another modification of the present invention, in which the means for shortening or increasing the length of vibrations of the reed comprises an arm, as 9', slidably contacting reed $5^2$, and extending upwardly and rearwardly therefrom, a rearwardly-extending rod, as $9^2$, secured to the upper end of arm 9' and passing through wall 4', and an upwardly-extending portion, as $9^3$, formed upon the outer free end thereof, the said extension being provided with a head, as 10', whereby an outward pull upon said head 10' will lengthen the vibratory portion of reed $5^2$, and thereby vary the sounds thereof to the desired pitch.

It will be readily seen that my improvement is not limited to a dinner-horn, but contemplates also a musical instrument, the reed and operating-stem being in such instance of a size and shape to admit of as many octaves in pitch as may be desired.

It will also be further observed that although the present invention has been described specifically, yet many minor changes in shape, size, and details may be made without departing from the spirit and scope of the invention.

Having thus fully described the invention, what is claimed as new, and desired to be secured by Letters Patent, is—

1. A reed-horn comprising a reed-box, the body portion of the horn being provided with a tapered end which extends into the said reed-box, a vibrating reed mounted on the tapered end of the horn, a stop in said reed-box movable along the tapered end of the horn against said reed to vary the amount of vibration thereof and thereby vary the tone produced by such vibration, substantially as described.

2. A reed-horn comprising a body portion, a reed-box inclosing one end thereof, a vibrating reed mounted therein, a stop interposed between the wall of the box and the said reed, and means for forcing the said stop longitudinally between the box-wall and the reed to vary the movement of the free vibrating end of the reed, substantially as described.

3. In a horn, the combination of a mouthpiece reed-box, a rear end thereto having a central opening, a stop-arm contacting with the reed and extending longitudinally through the rear end of the mouthpiece, and a handle on the outside end of the stop-arm whereby the arm may be moved longitudinally of the reed, substantially as described.

In testimony whereof I hereunto affix my signature in presence of two witnesses.

JOHN E. SPAFFORD.

Witnesses:
J. A. BOYD,
WARD D. DECKER.